Aug. 31, 1926.
J. A. THOMSEN
DIRECTION SIGNAL
Filed April 11, 1924    2 Sheets-Sheet 1
1,598,461
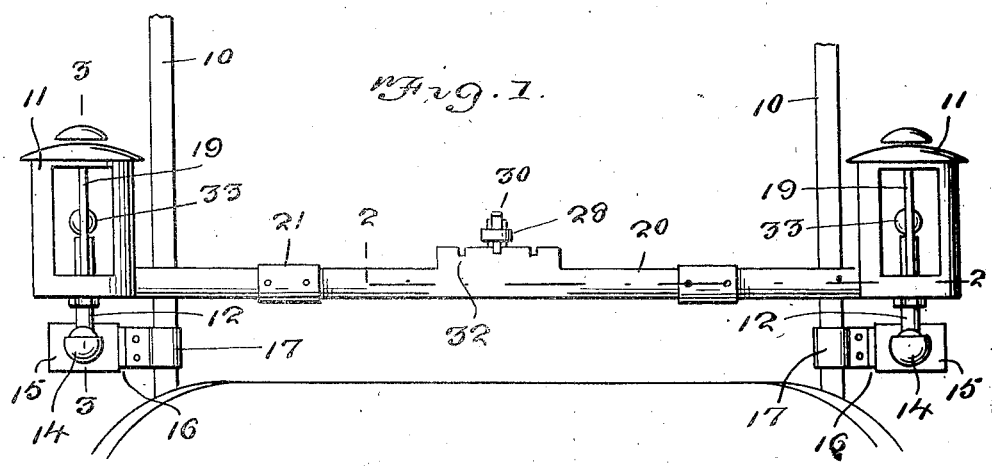
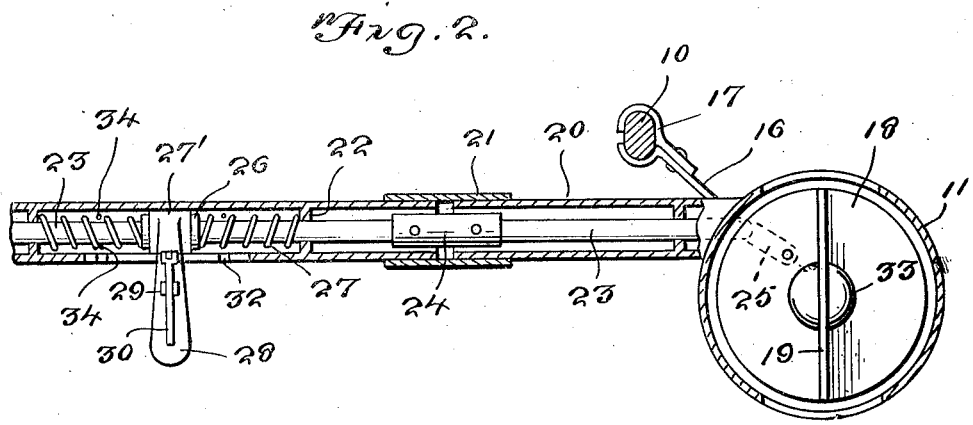

Aug. 31, 1926.
J. A. THOMSEN
1,598,461
DIRECTION SIGNAL
Filed April 11, 1924    2 Sheets-Sheet 2
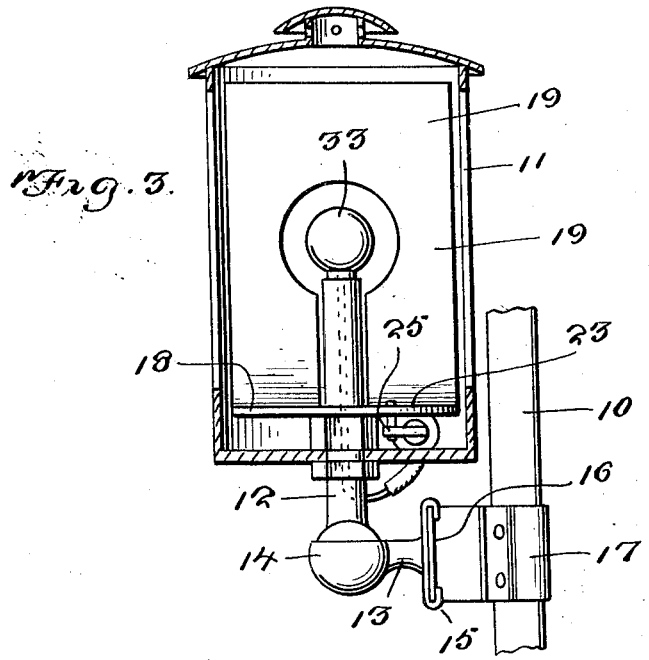
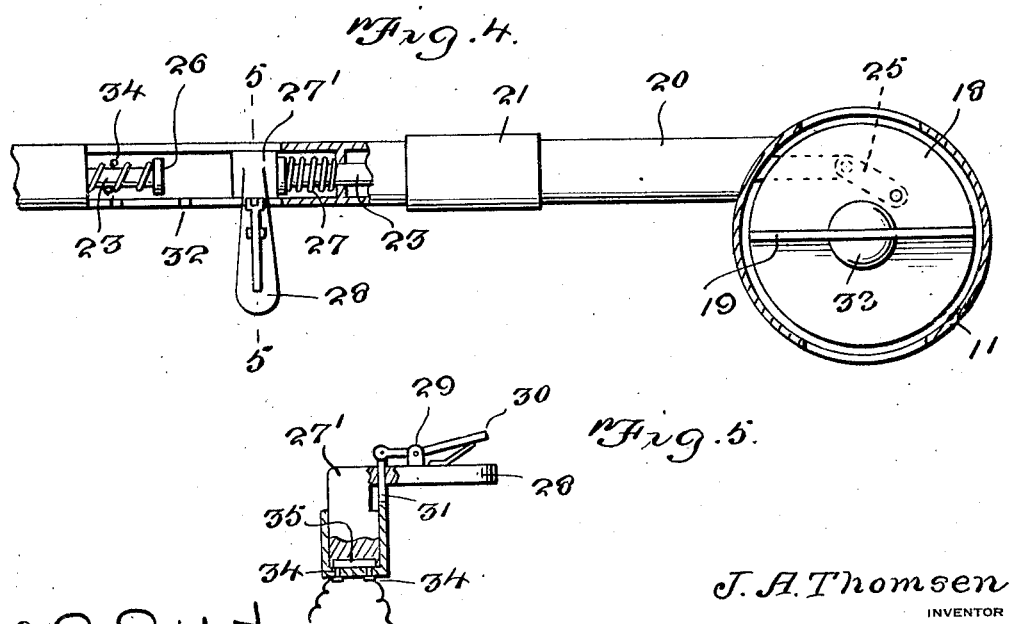
J. A. Thomsen
INVENTOR
BY Victor J. Evans
ATTORNEY Patented Aug. 31, 1926.

1,598,461

UNITED STATES PATENT OFFICE.

JACOB A. THOMSEN, OF PORTOLA, CALIFORNIA.

DIRECTION SIGNAL.

Application filed April 11, 1924. Serial No. 705,874.

This invention relates to vehicle signals and has for an object the provision of a signal which is adapted to be attached to an automobile or other vehicle whereby the driver may indicate proposed changes in the direction of travel in advance of such change, so that the drivers of other vehicles and pedestrians may be properly notified.

Another object of the invention is the provision of a signal which is adapted to be secured to each side of a vehicle, preferably upon each side of the vehicle windshield, means being provided whereby the signal may be adjusted so as to occupy a vertical position whether applied to a straight or slanting windshield.

Another object of the invention is the provision of simple and efficient means for operating the signal, whereby a signal upon either side of the vehicle may be selectively actuated or moved to an active position and held in such position until manually released.

Another object is the provision of a signal of the above character which includes both day and night signaling elements, the latter being electrically controlled, means being provided for closing a circuit through the same when the day signalling element is moved to an active position.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation showing a portion of the windshield frame of an automobile with the invention applied.

Figure 2 is an enlarged fragmentary section taken substantially on the line 2—2 of Figure 1.

Figure 3 is an enlarged section taken substantially on the line 3—3 of Figure 1.

Figure 4 is a view somewhat similar to Figure 2, the signal being shown in an active position and the guide partly in elevation.

Figure 5 is a section on the line 5—5 of Figure 4.

Referring to the drawings in detail wherein like characters of reference denote corresponding parts, the reference character 10 indicates a portion of the windshield of an automobile to which the invention is shown as applied. The invention includes a pair of signals one of which is located at each side of the windshield. Each of these signals comprises a casing 11 which is shown cylindrical, but which may be of any suitable configuration. The casing has extending therefrom the vertically disposed arm 12 of a substantially L-shaped bracket the horizontal arm 13 of this bracket being connected to the vertical arm by means of a universal joint 14 so that the arms may be relatively adjusted. The character of the joint 14 is such that the arms 12 and 13 will be frictionally held in adjusted position. The arm 13 carries a plate 15 which is provided with oppositely located guide grooves for the reception of a plate 16, the latter being carried by a clamp 17 which is secured to the windshield frame 10. Any suitable means may be provided for preventing accidental separation of the plates 15 and 16. For example, the edges of the plate 15 which form the guide grooves may be securely clamped upon the plate 16 after the device has been properly adjusted.

Mounted within each of the casings 11 is a rotatable signal element, the latter including a circular base 18 and a panel 19 which is normally positioned as shown in Figures 1 and 2 of the drawings but which may be rotated in a manner to be hereinafter described so as to be positioned as shown in Figure 4 of the drawings.

The casings 11 are connected by a tubular guide 20, the latter being of sectional formation and having its sections adjustably connected by sleeves 21 so that the length of the guide may be regulated to the width of the windshield. The guide 20 is provided with suitable bearing members 22 through which pass rods 23, the said rods having their adjacent ends spaced apart and extending in opposite directions. The rods are preferably formed in sections and the sections are adjustably connected by a coupling member 24.

The outer ends of the rods 23 are connected to the base 18 of the signal elements by means of links 25, while the inner adjacent ends of these rods are provided with heads 26. Springs 27 surround the rods and have one of their ends bearing against the heads 26 and their opposite ends bearing against one of the bearings 22 so as to normally force the rods in a direction towards one another and hold the signal in an inactive position.

Located within the guide 20 is a slide block 27' whose width is such as to provide a stop to limit the inward movement of the rods 23 and thus hold the panels of the signal elements in proper position when the latter are not in use. In order to operate the signals, the block 27' is moved longitudinally of the guide, the direction of movement depending upon the proposed direction of travel of the vehicle. That is, if it is intended to turn to the right, the block 27' is moved to the right so that the signal upon the right side of the automobile will be rotated to move the panel 19 to a position to be plainly seen by persons in the front or in the rear of the automobile. The block 27' is provided with an operating handle 28 which extends through a slot formed in the guide 20, while pivotally mounted upon this handle as shown at 29 is a spring actuated lever 30, the latter having pivotally secured at one end a latch 31. This latch is adapted to engage in one of a number of spaced notches 32 provided in the lower wall of the slot through which the handle 28 extends. There are three of these notches, the central notch when engaged by the latch 31 holding both signals inactive, while either of the notches 32 will be engaged by the latch when its respective signal is actuated.

Mounted upon the arm 12 of the supporting bracket of each casing is an electric lamp 33, the panel 19 being provided with an opening for the accommodation of this lamp and for the accommodation of the arm 12. The lamp is suitably connected with a source of current, while located within the bottom of the guide 21 upon each side of the center of the said guide are spaced pairs of contacts 34 which are included in the circuit with the lamps 33 and the source of current. The slide block 27 carries a contact 35 which is adapted to bridge one pair of contacts 34 when the slide is moved in one direction and the other pair when the slide is moved in an opposite direction so as to close a circuit through the particular lamp of either signal in a manner to be readily understood.

For daylight use, the panels 19 may be used for the purpose of signalling, the lamps 33 being cut out by a suitable manually operated switch (not shown). For night driving, the said manually operated switch may be closed so that a circuit will be completed through either of the lamps as previously set forth.

The invention is susceptible of various changes in its form, proportions and minor details of construction and the right is herein reserved to make such changes as properly fall within the scope of the appended claims.

Having described the invention what is claimed is:—

1. A direction signal for vehicles including a casing, a signal element rotatably mounted therein, said element including a vertically disposed panel, a tubular guide extending from the casing, a rod operating through the guide, a link connecting the rod and signal element, spring means for holding the signal element inactive, a slide block movable in the guide and engaging the rod to operate the latter and move the signal element to an active position and means engaging the slide to hold the latter against movement.

2. A direction signal for vehicles including a casing, a signal element rotatably mounted therein, said element including a vertically disposed panel, a tubular guide extending from the casing, a rod operating through the guide, a link connecting the rod and signal element, means for holding the signal element inactive and means movable in the guide and engaging the rod to operate the latter and move the signal element to an inactive position, a bracket for supporting the casing and a universal joint included in the bracket whereby the position of the casing may be adjusted.

3. A direction signal for vehicles including a normally inactive rotatably mounted signal element adapted to be positioned upon opposite sides of a vehicle, means for securing the signal elements in position, oppositely extending operating rods having their adjacent ends spaced apart, means for operatively connecting the outer ends of the rods with the signal elements, a guide for the rods, means engaging the rods for holding the signal elements in inactive position, a slide located between and adapted to engage the adjacent ends of the rods, whereby the signal elements may be selectively moved to an active position and means for holding the slide against accidental movement.

In testimony whereof I affix my signature.

JACOB A. THOMSEN.